United States Patent [19]
Bender et al.

[11] Patent Number: 5,166,286
[45] Date of Patent: Nov. 24, 1992

[54] POLYMERS HAVING TERMINAL HALOGEN ATOMS

[75] Inventors: Dietmar Bender, Schifferstadt; Klaus Bronstert, Carlsberg; Rainer Becker, Bad Durkheim, all of Fed. Rep. of Germany

[73] Assignee: BASF Aktiengesellschaft, Ludwigshafen, Fed. Rep. of Germany

[21] Appl. No.: 668,355

[22] Filed: Mar. 11, 1991

Related U.S. Application Data

[63] Continuation of Ser. No. 409,583, Sep. 19, 1989, abandoned.

[30] Foreign Application Priority Data

Oct. 5, 1988 [DE] Fed. Rep. of Germany ....... 3833818

[51] Int. Cl.$^5$ ............................................. C08F 10/10
[52] U.S. Cl. ................................ 526/348.7; 526/204; 526/237; 526/348
[58] Field of Search ..................... 526/204, 237, 348.7, 526/348

[56] References Cited

U.S. PATENT DOCUMENTS

| | | | |
|---|---|---|---|
| 4,316,973 | 2/1982 | Kennedy | 525/335 |
| 4,342,849 | 8/1982 | Kennedy | 525/333.7 |
| 4,611,037 | 9/1986 | Musch et al. | 526/135 |

FOREIGN PATENT DOCUMENTS

| | | | |
|---|---|---|---|
| 0206756 | 12/1986 | European Pat. Off. | 526/237 |
| 0265053 | 4/1988 | European Pat. Off. | |
| 0083241 | 7/1971 | German Democratic Rep. | 526/237 |

OTHER PUBLICATIONS

Polymer Bulletin 17, 7–13 (1987), Living Carbocationic Polymerization Kennedy et al.

*Primary Examiner*—Fred Teskin
*Attorney, Agent, or Firm*—Keil & Weinkauf

[57] ABSTRACT

Polymers having terminal halogen atoms and consisting of cationically polymerizable, olefinically unsaturated monomers are obtainable by polymerization using an initiator system comprising a halogen-containing Lewis acid and a 3-membered to 8-membered cyclic ether.

12 Claims, No Drawings

POLYMERS HAVING TERMINAL HALOGEN ATOMS

This application is a continuation of application Ser. No. 409,583, filed on Sep. 19, 1989 now abandoned.

Polymers having terminal halogen atoms

The present invention relates to novel polymers having terminal halogen atoms and consisting of cationically polymerizable, olefinically unsaturated monomers, obtainable by polymerization using an initiator system comprising a halogen-containing Lewis acid and a 3-membered to 8-membered cyclic ether.

The synthesis of telechelic polymers, ie. macromolecules having two reactive terminal groups, is described by J.P. Kennedy in U.S. Pat. No. 4 342 849, U.S. Pat. No. 4 316 973 and EP-A 206 756. Here, the polymerization of cationically polymerizable monomers is initiated by a binary mixture of an arylalkyl dihalide as an initiator and a halogen-containing Lewis acid as a coinitiator. As a result of intramolecular Friedel-Crafts reactions, however, the macromolecules obtainable thereby have on average less than two halogen atoms at the chain ends, so that they are therefore only of limited use for the preparation of pure block copolymers The same applies to polymer-analogous reactions in which it is intended to introduce certain other terminal groups at both chain ends.

If tertiary aliphatic halides are used as initiators, a Friedel-Crafts reaction cannot take place, but such initiators are often difficult to prepare and are generally incorporated only in a small percentage in the macromolecule.

In the initiation of the cationic isobutene polymerization by aryl alkyl ethers (Polymer Bulletin 17 (1987), 7), the resulting macromolecules possess, in some cases, terminal indane groups at reaction temperatures above −70° C. owing to intramolecular Friedel-Crafts reactions, greatly restricting their usefulness as telechelic polymers. They are also relatively impure.

It is an object of the present invention to overcome the disadvantages described and to provide cationic polymers of olefinically unsaturated monomers having terminal halogen atoms in an economical and readily reproducible manner.

We have found that this object is achieved by novel polymers which have terminal halogen atoms and are obtainable by cationic polymerization of olefinically unsaturated monomers using an initiator system comprising a halogen-containing Lewis acid and a 3-membered to 8-membered cyclic ether.

The cyclic ethers to be used according to the invention may be saturated or unsaturated, may contain further oxygen atoms as ether functions in the ring and may have, on the carbon atoms, inert substituents, such as alkyl, cycloalkyl, arylalkyl, alkoxy, aryl or fused radicals, the total number of carbon atoms preferably being not more than 50.

Preferably used initiators are 5-membered cyclic ethers, ie. furan compounds. 2,5-Dihydrofuran derivatives and tetrahydrofuran derivatives, in particular those which carry methyl, ethyl or cyclohexyl groups as substituents in the 2- and/or 5-position, are very suitable.

Particularly suitable ethers are 2,2-dimethyldihydrofuran, 2,5-dimethyldihydrofuran, 2,2,5,5-tetramethyldihydrofuran, 2,2-ethylmethyldihydrofuran, 2,5-di-ethyldihydrofuran, 2,2,5,5-tetraethyldihydrofuran, 2,3-dihydrobenzofuran, dispiro[cyclohexane-1',2,1'',5-dihydrofuran], 2,2-dimethyltetrahydrofuran, 2,2-diethyl-5,5-dimethyltetrahyd-rofuran and 2,2,5,5-tetraethyltetra-hydrofuran. These cyclic ethers are known or are obtainable in a known manner.

The coinitiators used are halogen-containing Lewis acids, such as $BX_3$, $AlX_3$, $SnX_4$, $TiX_4$, $SbX_6$ or $FeX_3$, where X may be fluorine, chlorine, bromine or iodine. Of particular importance are the chlorides, of which boron trichloride is preferably used.

Suitable monomers or comonomers are the known cationically polymerizable, olefinically unsaturated compounds of 4 to 14 carbon atoms, and suitable olefinic hydrocarbons are 1-butene, 2-methyl-1-butene, 4-methyl-1-pentene, vinylcyclohexane and styrene, and vinyl ethers are also suitable. Isobutene is preferred.

To carry out the polymerization, the cyclic ether is preferably used in an inert solvent in a concentration of from $10^{-6}$ to $10^{-1}$ mole per mole of the monomer used. The coinitiator is added in a 1-fold to 200-fold molar excess, based on the cyclic ether. The polymerization is usually carried out at from −130° C. to +30° C., preferably below 0° C.

The novel polymers have on average virtually the theoretical number of two halogen atoms as terminal groups, a value which could not be achieved with the conventional polymerization methods. The macromolecules obtained furthermore have a very narrow molecular weight distribution compared with the conventional telechelic polymers having terminal halogen atoms. A particular advantage of the novel polymers is that their synthesis can be carried out at temperatures which are relatively high for cationic polymerizations. The polymerization can be effected by the conventional methods, continuously or batchwise. The polymers according to the invention are furthermore suitable for the preparation of substantially pure block copolymers. The initiators preferably used are virtually quantitatively incorporated in the macromolecules formed.

EXAMPLES 1 TO 8

The polymerizations were carried out under a nitrogen atmosphere in a stirred reactor by a procedure in which the initiator and the coinitiator in methyl chloride were mixed at −30° C. for 15 seconds and the monomer was then added. After a reaction time of from 30 to 180 minutes, the polymerization was terminated by adding methanol. After the solvent had been evaporated off, the polymer was dissolved in pentane, washed several times with water and dried under reduced pressure at 50° C.

The telechelic polymers were characterized by GPC and $^1$H-NMR measurements as well as elemental analysis methods.

The molecular weights, in particular the weight average molecular weight Mw and the number average molecular weight Mn, were determined by GPC. A column combination of $\mu$-Ultrastyragel $10^2$, $10^3$ and $2.10^4$ was used for the chromatographic measurements. Tetrahydrofuran served as the mobile phase. The elution curves were calibrated using polyisobutene standards.

The quotient Mw/Mn is a measure of the uniformity of polymers, ie. very little scatter of the molecular weight. The more this quotient deviates from 1, the more nonuniform the polymer is. The values of from 1.1 to 1.6 obtainable in the Examples correspond to high uniformity.

From the chlorine content determined by elemental analysis, and assuming that all macromolecules carry two chlorine atoms as terminal groups, it was possible to calculate the corresponding molecular weight Mn (EA-Cl), which was in good agreement with the number average molecular weight Mn (GPC) obtainable by GPC measurements.

A further number average molecular weight Mn ($^1$H-NMR) was calculated from the results of the $^1$H-NMR spectroscopy. Here, the intensities of the resonance signals of nonterminal methyl and methylene groups were compared with those of the terminal groups, which are shifted to high field owing to the adjacent chlorine atoms.

The functionality Fn of the polymers was determined using the formulae $$Fn = \frac{Mn(GPC)}{Mn(EA - Cl)} \times 2 \text{ and } Fn = \frac{Mn(GPC)}{Mn(^1H\text{-}NMR)} \times 2$$

The good agreement between the number average molecular weights Mn (EA-Cl) and Mn ($^1$H-NMR) obtainable by terminal group methods and the values of Mn (GPC) obtainable from GPC measurements showed that Fn was close to two in all Examples.

The exact analytical results are shown together with the experimental parameters in the Table below.

of a 2,2,5,5-tetramethyldihydrofuran, 2,2,5,5-tetraethyldihydrofuran and mixtures thereof.

2. A polymer as defined in claim 1, wherein the halogen-containing Lewis acid is a halide of boron, tin, aluminum, titanium, antimony or iron.

3. A polymer as defined in claim 1, wherein boron trichloride is used as the halogen-containing Lewis acid.

4. A polymer as defined in claim 1, wherein the cationic polymerization is carried out at a temperature of from $-130°$ C. to $30°$ C.

5. A polymer as defined in claim 1, wherein the concentration of said dihydrofuran derivative present in the process is from $10^{-8}$ to $10^{-1}$ mole per mole of the monomer used, and the Lewis acid is present in a molar ratio of from 1:1 to 200:1 based on said dihydrofuran derivative.

6. A polymer as defined in claim 1, wherein isobutene is used as the cationically polymerizable monomer.

7. A process for preparing a polymer having terminal halogen atoms which comprises: cationically polymerizing a monomer in the presence of an initiator system which includes a halogen-containing Lewis acid and a dihydrofuran derivative selected from the group consisting of 2,2,5,5-tetramethyldihydrofuran, 2,2,5,5-tetraethyldihydrofuran and mixtures thereof.

8. The process of claim 7, wherein the halogen-containing Lewis acid is a halide of boron, tin, aluminum, titanium, antimony or iron.

9. The process of claim 7, wherein boron trichloride

TABLE

Polymerization of isobutene (III) with 2,2,5,5-tetramethyldihydrofuran (I) and boron trichloride (II) in methyl chloride

| Ex-ample | Concentrations in mol/l | | | Yield+ in % by wt. | Mn (GPC) | Mn (EA-Cl) | Mn ($^1$H-NMR) | Mw/Mn (GPC) | Fn (EA-Cl) | Fn ($^1$H-NMR) |
|---|---|---|---|---|---|---|---|---|---|---|
| | I | II | III | | | | | | | |
| 1* | 0.0257 | 0.23 | 0.88 | 74 | 1480 | 1540 | 1560 | 1.36 | 1.9 | 1.9 |
| 2* | 0.0239 | 0.214 | 1.62 | 56 | 1810 | 2030 | 1940 | 1.60 | 1.8 | 1.9 |
| 3* | 0.0529 | 0.230 | 0.93 | 98 | 1130 | 1290 | 1200 | 1.12 | 1.8 | 1.9 |
| 4* | 0.0529 | 0.430 | 1.62 | 74 | 1360 | 1510 | 1460 | 1.29 | 1.8 | 1.9 |
| 5* | 0.0239 | 0.430 | 1.62 | 73 | 2580 | | 2780 | 1.22 | | 1.9 |
| 6** | 0.0239 | 0.230 | 1.62 | 81 | 2870 | 3220 | 3070 | 1.38 | 1.8 | 1.9 |
| 7** | 0.0296 | 0.230 | 1.62 | 82 | 2390 | 2620 | 2420 | 1.42 | 1.8 | 2.01.9 |
| 8** | 0.0064 | 0.230 | 0.88 | 66 | 5320 | 5200 | | 1.26 | 2.0 | |

*Reaction time 30 minutes
**Reaction time 120 minutes
+Yield of polymer, based on the amount of monomer.

Examples 1 to 8 show that the functionality of the telechelic polymers is about two, within the analytical error. The yields vary only slightly with the ratio of initiator to coinitiator and can be further increased by prolonging the reaction times.

We claim:

1. A polymer having terminal halogen atoms, which polymer is produced by cationically polymerizing an olefinic monomer in the presence of an initiator system comprising a halogen-containing Lewis acid and a dihydrofuran derivative selected from the group consisting is used as the halogen-containing Lewis acid.

10. The process of claim 7, wherein the polymerization is carried out at a temperature of from $-130°$ C. to $+30°$ C.

11. The process of claim 7, wherein said dihydrofuran derivative is present during the polymerization in a concentration of from $10^{-6}$ to $10^{-1}$ mole per mole of the monomer used, and the Lewis acid is present in a molar ratio of from 1:1 to 200:1 based on said dihydrofuran derivative.

12. The process of claim 7, wherein isobutene is used as the cationically polymerizable monomer.

* * * * *